United States Patent [19]

Cheng et al.

[11] 4,433,558

[45] Feb. 28, 1984

[54] PARALLEL CONTACT DISTILLATIVE FREEZING PROCESS FOR SEPARATING VOLATILE MIXTURES AND APPARATUSES FOR USE THEREIN

[76] Inventors: Chen-Yen Cheng; Sing-Wang Cheng, both of 9605 La Playa St., NE, Albuquerque, N. Mex. 87111

[21] Appl. No.: 307,507

[22] Filed: Oct. 1, 1981

Related U.S. Application Data

[63] Continuation-in-part of Ser. No. 296,130, Aug. 25, 1981, Pat. No. 4,378,984, Ser. No. 181,002, Aug. 22, 1980, abandoned, and Ser. No. 930,312, Aug. 2, 1978, Pat. No. 4,218,893.

[51] Int. Cl.$^3$ .............................................. B01D 9/04
[52] U.S. Cl. ........................................... 62/537; 34/5
[58] Field of Search ............... 62/537, 532, 534; 34/5

[56] References Cited

U.S. PATENT DOCUMENTS

| | | | |
|---|---|---|---|
| 2,507,632 | 5/1950 | Hickman | 62/537 |
| 3,024,117 | 3/1962 | Barlow | 34/5 |
| 3,385,074 | 5/1968 | Aronson | 62/537 |
| 4,218,893 | 8/1980 | Cheng et al. | 62/537 |

Primary Examiner—Frank Sever

[57] ABSTRACT

The parallel contact distillative freezing process is an improved distillative freezing process. The distillative freezing process is used in separating a mixture containing at least two volatile components, denoted respectively as A-component and B-component, by simultaneously vaporizing the two components from the mixture under a sufficiently reduced pressure to simultaneously crystalline B-component. The vapor mixture obtained is brought to a condensed state by lowering its temperature a few degrees without substantially pressurizing it. The process may be continued to completely eliminate the liquid phase and bring the mixture into the two phase solid-vapor region. Then, the solid phase is no longer contaminated by the adhering liquid phase and gives a high purity B-component on melting. The parallel contact distillative freezing process is conducted within an elongated processing zone, wherein feed is introduced at one end and the purified B-solid and the low pressure vapor are both discharged at the other end. The vapor, solid and liquid are all transferred in the same direction; the vapor is allowed to interact with the liquid constantly as the vaporization and solidification take place.

20 Claims, 15 Drawing Figures

(a) Feed  (b) Product (a) Feed    (b) Product

DRAWING 1

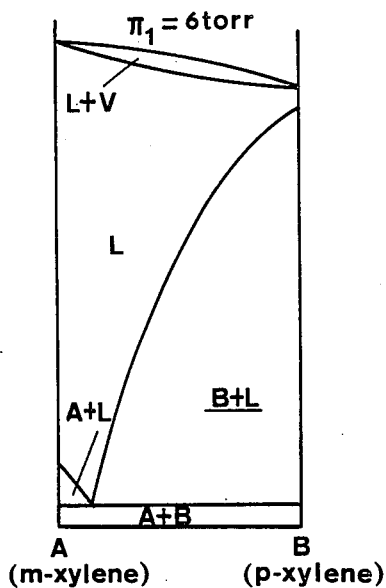
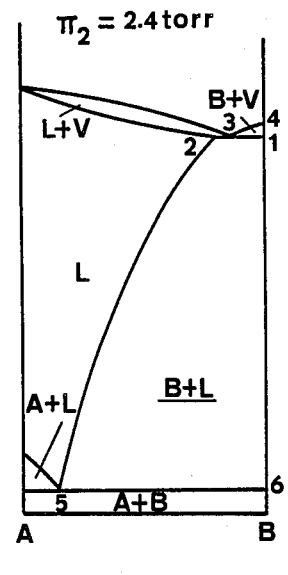
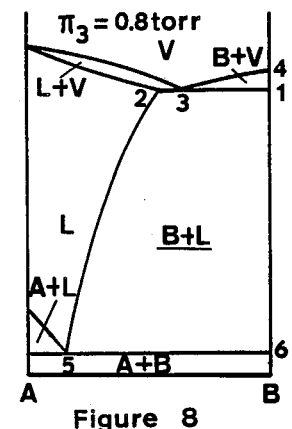
Figure 8
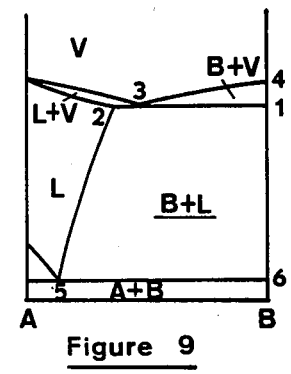
Figure 9
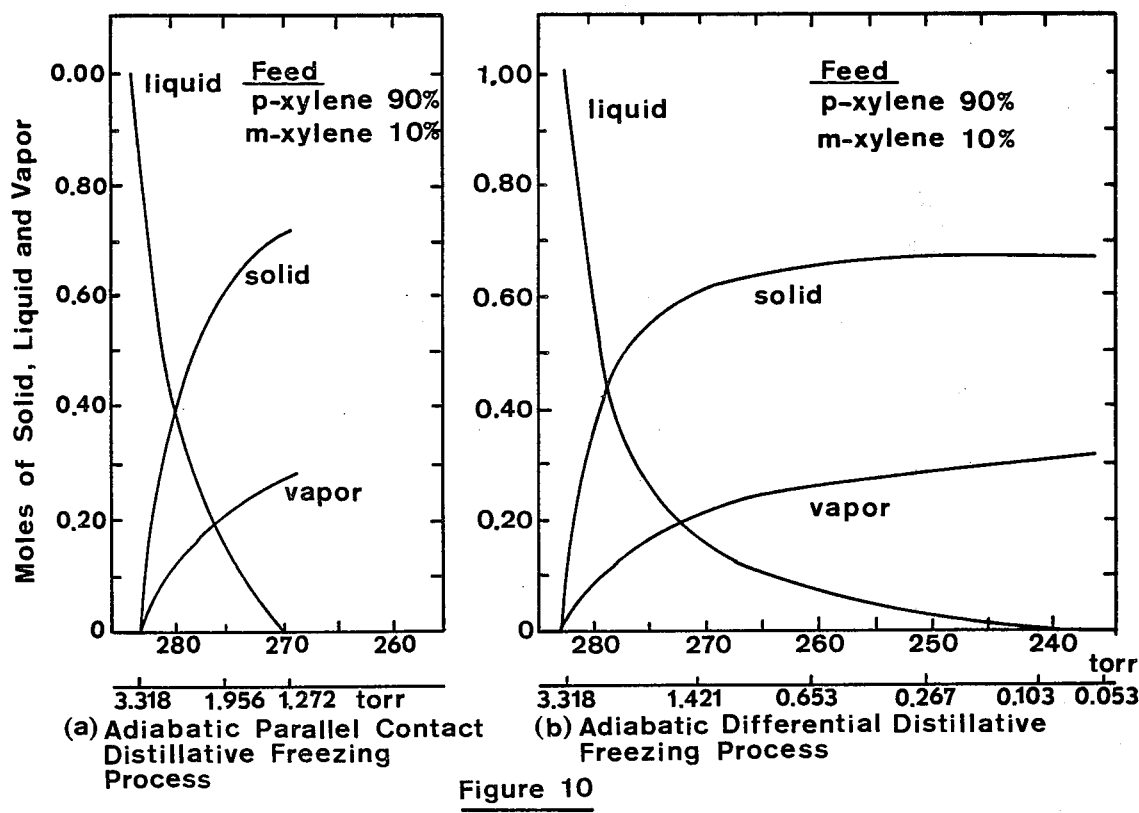
Figure 10
DRAWING 2

DRAWING 3

DRAWING 4

PARALLEL CONTACT DISTILLATIVE FREEZING PROCESS FOR SEPARATING VOLATILE MIXTURES AND APPARATUSES FOR USE THEREIN

RELATED APPLICATIONS

This application is a continuation-in-part application of the Ser. No. 6/296,130 application filed on Aug. 25, 1981, on which U.S. Pat. No. 4,378,984 was issued on Apr. 5, 1983, Ser. No. 181,002 application filed on Aug. 22, 1980, which has been abandoned, and Ser. No. 930,312 application filed on Aug. 2, 1978, on which U.S. Pat. No. 4,218,893 was issued on Aug. 26, 1980.

BACKGROUND OF THE INVENTION

1. Field of Invention

Separation of a mixture containing volatile components is a very important operation in chemical industries. In some cases, the required product purities are very high. Examples are production of polymerization grade monomers, such as ethylene, propylene, styrene, butadiene and p-xylene. Distillation operations have been used in most cases and freezing operations have been used in some special cases. The parallel contact distillative freezing process disclosed combines the advantageous features of both the distillation and freezing operations and remove their disadvantages.

2. Brief Description of the Prior Art

When a distillation operation is used in separating a mixture containing components that are very close in boiling points and volatilities, the number of plates required is very large and a large reflux ratio has to be used. Therefore, both the equipment cost and operating cost are very high. Furthermore, these costs increase greatly as the required product purity increases. Separations of ethylene-ethane mixtures, propylene-propane mixtures, styrene-ethylbenzene mixtrues and p-xylene-m-xylene mixtures in producing high grade ethylene, proylene, styrene and p-xylene respectively are good examples. There is a great need for finding a better and more economical way of accomplishing the desired separations.

In a conventional fractional solidification process, a feed containing a crystallizing component and one or more impurities is brought into a two phase solid-liquid region to form a mixture containing crystals of the crystallizing component and a liquid mixture containing the impurities. An expensive scraped surface freezer is usually used in this operation. A centrifuge or a hydraulic washing column is then used to free the crystals from the mother liquor. Even though the crystals formed are usually very pure, it has been very difficult to produce a very high purity product of the crystallizing component, because a complete separation of the crystals from the surrounding impure liquid phase is difficult. Furthermore, equipment cost of a conventional solidification process is usually very high.

It is important to distinguish the distillative freezing process of the present invention from a vacuum freezing desalination process, a vacuum crystallization process, a vacuum drying process, and a conventional desublimation process for removing a component from a gas mixture. In a vacuum freezing desalination process (also called an evaporative freezing process), only one component (water) vaporizes and the same component (water) freezes. In a vacuum crystallization process or a vacuum drying process, only one component (solvent) evaporates while the other component (solute) crystallizes. In a conventional desublimation process, a gas mixture is cooled down to a very low temperature to remove a crystallizing component (e.g. carbon dioxide or phthalic anhydride) by a desublimation operation and simply discharge the residual gas. In a distillative freezing process, two or more components are vaporized from a feed under a sufficiently reduced pressure and only one component freezes. The low pressure vapor formed in a distillative freezing process is transformed completely into a condensed mas without pressurization by slightly lowering its temperature. The phase behavior of a binary system to which a distillative freezing process applies is distinct from phase behaviors of binary systems to which these processes apply.

BRIEF DESCRIPTION OF THE INVENTION

The distillative freezing process is a highly effective and energy conserving process for separating a mixture containing volatile components with close volatilities and produces a super pure product of the major component. The parallel contact distillative freezing process disclosed is an improved distillative freezing process. The improved process discharges the low pressure vapor at a high impurity concentration, increases the yield of the purified product, raises the drying-up pressure to be defined and raises the condensing temperature.

The distillative freezing process comprises two major operations: In the first step, the mixture is partially vaporized under a reduced pressure to thereby crystallize the major component simultaneously. This operation is continued to completely eliminate the liquid phase and bring the mixture into the two phase solid-vapor region. Then, the solid phase is no longer contaminated by the adhering liquid phase and gives a super pure product of the major component. In the second step, the low pressure vapor is transformed into a condensed mass by slightly lowering its temperature without pressurizing it. The operating pressure at which a mixture is taken to complete dryness is called the drying-up pressure.

The parallel contact distillative freezing process is conducted within an elongated processing zone, wherein feed is introduced at one end and the purified B-solid and the low pressure vapor are both discharged at the other end. Pressure decreases from the feed end to the descharge end, the pressure distribution being maintained by the flow of low pressure vpor. The vapor and solid formed and the liquid that remains are all transferred in the same direction and the vapor is thus allowed to interact with the liquid constantly as the vaporization and solidification take place.

The low pressure vapor mixture so produced contains a high concentration of the impurify; the yield of the superpure product is increased; the drying-up pressure and the condensing temperature are raised.

A rotary tray distillative freezer comprises a vacuum enclosure and a number of rotary trays stacked up vertically. Each tray is provided with a feeder and a scraper. A tray and the space between the tray and its upper tray form a peripheral processing zone. As the tray rotates, feed is added at a stationary position and the liquid phase is simultaneously transformed into solid and vapor. The vapor is allowed to interact with the liquid mass downstream and all the vapor discharged is at the final composition. Purified product is scraped off of each tray and is transferred to a melter. A belt conveyor distillative freezer comprises a distillative freezing zone, a condensing zone and a product melting zone. A number of belt conveyors are stacked up vertically in the distillative freezing zone. Feed is added on the belt conveyors at the first end and the purified crystals are discharged at the second end. Again, vapor is allowed to interact with the liquid mass downstream. Purified solid is melted by first vaporizing a mass of the purified product and allow the vapor to interact with the solid.

BRIEF DESCRIPTION OF THE DRAWINGS

FIGS. 6 through 9 illustrate how phase diagrams of a binary system containing two volatile components vary as the pressure is reduced and will be used to explain the progress of a distillative freezing operation.

FIGS. 10-a and 10-b compare the performances of the parallel contact distillative freezing operation and the differntial vapor discharge distillative freezing operation. They show that the former method has advantages over the latter method: the yield is higher in the former method, 0.73 mole vs 0.68 mole; the drying-up pressure is higher in the former method, 1.272 torr vs 0.053 torr; the final three phase temperature is higher in the former method, 268.6° K. vs 234° K.

DESCRIPTION OF PREFERRED EMBODIMENT OF THE INVENTION

1. An outline of the Distillative Freezing Process

Figure 1:
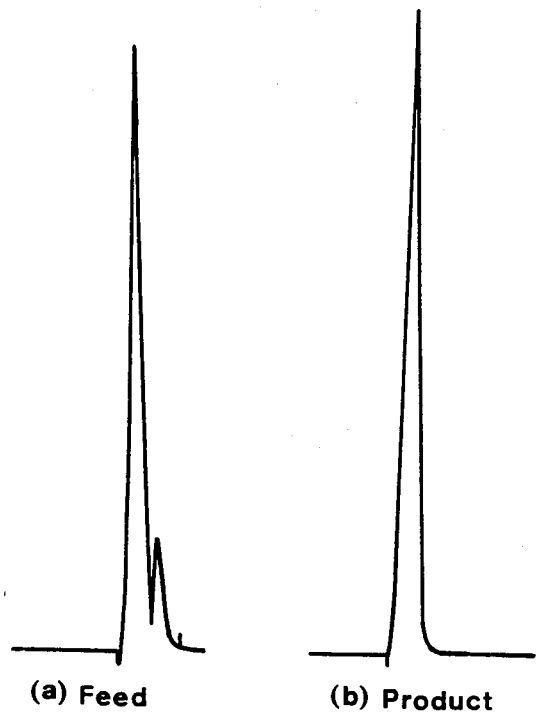
FIG. 1 illustrates the degree of superpurification that can be obtained by comparing gas chromatograms of the feed used and the product obtained in a parallel contact distillative freezing experiment.

In the distillative freezing process, a feed containing at least two volatile components, a major and crystallizing component (B-component) and a minor and non-crystallizing component (A-component), is flash vaporized under a sufficiently reduced pressure to simultaneously crystallize the B-component. This process is continued to completely eliminate the liquid phase and bring the mixture into the two phase solid-vapor region. Then, the solid phase is no longer contaminated by an adhering liquid phase and gives a super pure product of the B-component upon melting. The low pressure vapor is brought to a condensed state either by a simple condensation or a mixed condensation-desublimation operation, by lowering its temperature a few degrees without any pressurization. As an example, a feed (100 grams) containing 90% p-xylene and 10% m-xylene has been processed and 70 gram of super pure p-xylene (99.99+%) has been produced. All the m-xylene goes into the concentrate (30 gram), which contains 30% m-xylene. FIG. 1 shows gas chromatograms of the feed used and the superpurified p-xylene obtained. The process can therefore be used in producing high purity monomers for the polymer industries and high purity chemicals for other industries.

Figure 2:
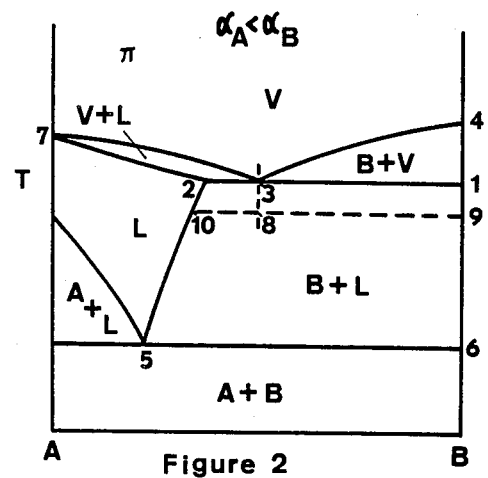
FIGS. 2 and 3 respectively illustrate low pressure phase diagrams of Type 1 and Type 2 systems to which the distillative freezing process can be applied. The characteristic features of systems to which the process can be applied will be explained by referring to these figures.
Figure 3:
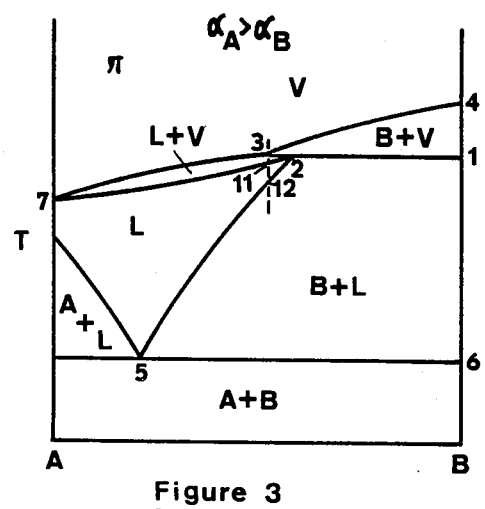

In order for the process to work, the ratio of the vapor pressures of the non-crystallizing and crystallizing components has to be within a proper range and the low pressure phase diagram of the system has to have certain characteristic features. These features are explained by referring to phase diagrams of binary systems to which the process can be applied. FIG. 2 illustrates a low pressure phase diagram of a type 1 system in which the volatility of the crystallizing component ($a_B$) is higher than that of the non-crystallizing component ($a_A$); FIG. 3 illustrates a similar diagram for a type 2 system in which the volatility of the crystallizing component is less than that of non-crystallizing component. The characteristic features that are common in these diagrams are that there is a three phase (B-solid, liquid, vapor) temperature 1-2-3 (denoted as B-L-V Temperature), and there are two phase (B-solid, vapor) region 1-3-4 (denoted as B-V region) and a two phase (B-solid, liquid) region 1-2-5-6 (denoted as B-L region) above and below the three phase B-L-V temperature respectively. It is noted that liquid-vapor regions 2-3-7 are respectively above and below the B-L-V temperatures in these systems.

Processing of a Type 1 mixture comprises the following four steps:

(1) Step 1: Distillative Freezing Operation

This step is mostly a three phase transformation by which the feed is partially vaporized and solidified and the operation is continued until the liquid phase is completely eliminated.

(2) Step 2: Condensation-Desublimation

In this step, the low pressure vapor mixture obtained in Step 1 is cooled without being substantially pressurized and is transformed into a condensate-desublimate. Some of the desublimate formed may adhere to the condenser surface.

(3) Step 3: Melting of Purified B-Solid

In this step, the purified B-solid obtained in Step 1 is melted to give a very pure B-product.

(4) Step 4: Melting of Desublimate or Adhering Solid

In this step, the desublimate or adhering solid obtained in Step 2 is melted. The condensate-desublimate is transformed into a liquid mixture which constitutes a B-lean product.

Processing of a Type 2 mixture comprises the following three steps: a distillative freezing operation (Step 1), a simple condensation (Step 2) and melting of purified B-solid (Step 3). The steps 1 and 3 are similar to the corresponding steps used in processing a Type 1 mixture. In processing a Type 2 mixture, the low pressure vapor can be condensed completely into a liquid mass by simply lowering its temperature slightly. The distillative freezing operation, the condensation-desublimation operation and the simple condensation are further explained in the following sections.

2. The Distillative Freezing Operation

Figure 4:
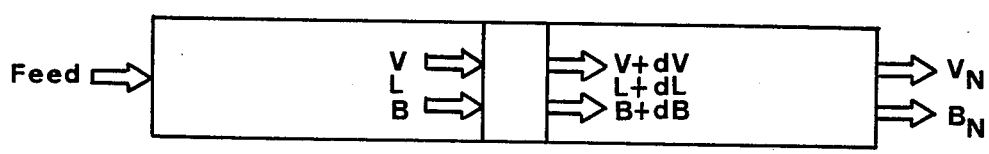
FIG. 4 illustrates the parallel contact distillative freezing process (method 1), illustrating cocurrent movements of solid, liquid and vapor in the processing zone and illustrating a constant interaction of the vapor and liquid. Vapor is discharged only at the final stage.
Figure 5:
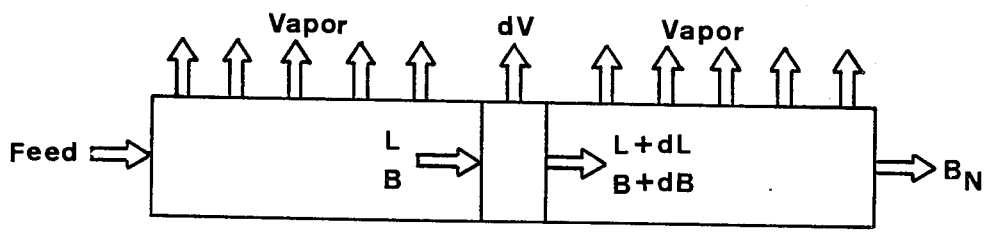
FIG. 5 illustrates the differential vapor discharge distillative freezing process (method 2). In this method, vapor is removed from the processing zone as it is formed and therefore is not allowed to interact with the liquid down-stream. Advantages of method 1 over method 2 will be described.

Two methods of conducting the distillative freezing operation are described in this section. These are:
  (a) Parallel Contact Distillative Freezing (method 1)
  (b) Differential Vapor Discharge Distillative Freezing (method 2)
These methods are illustrated by FIGS. 4 and 5 respectively. The first method is conducted within an extended processing zone, wherein feed is introduced at one end and the purified B-solid and the low pressure vapor are both discharged at the other end. Pressure decreases from the feed end to the discharge end, the pressure distribution being maintained by the flow of low pressure vapor. The vapor and solid formed and the liquid that remains are all transferred in the same direction and the vapor is allowed to interact with the liquid constantly as the vaporization and solidification take place. In the second method, vapor is removed from the processing zone as it is formed and therefore is not allowed to interact with the liquid down stream. The first method definitely has advantages over the second method. The second method however may be used to process a dilute mixture.

These two methods are compared by referring to separations of binary mixtures of p-xylene (B-component) and m-xylene (A-component). Phase diagrams of this system under pressures $\pi_1(=6\text{ torr})$, $\pi_2(=2.4\text{ torr})$, $\pi_3(=0.8\text{ torr})$ and $\pi_4(=0.34\text{ torr})$ are illustrated by FIGS. 6 through 9 respectively. It shows that B-L-V line does not exist under 6 torr, and the length of the B-L-V line 1-2-3 increases as the pressure decreases. According to the Phase Rule, the degree of freedom under the three phase state is one. Therefore, the three phase temperature, the liquid and vapor compositions under the three phase state are all functions of the pressure. It is seen that m-xylene concentrations in the liquid and vapor increase as the pressure decreases, and the area of B-V region 1-3-4 also expands as the pressure decreases.

By applying material balance, energy balance, and equilibrium relations, one can relate amounts of liquid, solid and vapor as functions of pressure in these methods. FIG. 10-a shows that, when one mole of feed containing 10% m-xylene is processed by the first method, the liquid mass becomes zero at 1.272 torr and 268.6 K ($-4.4°$ C.), and 0.73 mole of purified p-xylene crystals is harvested. All the m-xylene goes into the 0.27 mole of low pressure vapor discharged; all the vapor is discharged at a uniform composition of 36% m-xylene. In contrast, FIG. 10-b shows that, when the second method is used, the liquid mass becomes zero at 0.053 torr and 234 K ($-39°$ C.), which are considerably lower than those of the first method. The mass of purified p-xylene solid 0.68 moles which is less than that of the first method. All the m-xylene goes into the 0.32 mole of the low pressure vapor and the composition of the discharged vapor ranges from about 10% at the beginning to about 76% at the end.

In summary, method 1 has the following advantages over method 2:

(1) The yield of purified B-solid in method 1 is significantly higher than that of method 2.

(2) The drying-up pressure, defined as the pressure at which liquid mass becomes zero, is considerably higher is method 1.

(3) The drying-up temperature, defined as the temperature at which liquid mass becomes zero, is considerably higher in method 1.

Therefore, the operating pressure and condenser temperature in method 1 are considerably higher than those of method 2. These differences however decrease as the impurity concentration in the feed decreases.

Normally, a chemical engineer will expect that a counter-current operation is better than a parallel current operation: a counter-current heat exchange is better than a co-current heat exchange; a counter-current gas absorption is preferred over a co-current gas absorption; a counter-current extraction is superior to a co-current extraction. However, in the distillative freezing process, the parallel contact distillative freezing operation is the superior operation. The reasons are described as follows:

Let it be assumed that a distillative freezing operation is conducted in an elongated processing zone having a first end and a second end and the condensed mass including B-solid and liquid is moved from the first end to the second end. Since a large amount of B-solid is formed as the liquid is vaporized, the liquid phase is enriched with a A-component as it moves from the first end to the second end. It is seen from FIGS. 6 through 9 that the B-L-V temperature and B-L-V pressure decrease as the concentration of the non-crystallizing component increases. Therefore, the pressure in the processing zone decreases from the first end to the second end. In the parallel contact distillative freezing operation, the vapor also flows from the first end to the second end in the direction of pressure decrease. Therefore, there is no need to presesurize the vapor. The vapor contacts with liquid containing successively higher concentration of A-component and is enriched with A-component. When the vapor is discharged at the second end, it contains a high concentration of A-component. Should a counter-current operation be adopted, a multistage system with interstage pressurizations of the vapor would be required and the vapor that would be discharged from the first end would contain A-component in a low concentration.

3. Transforming the Low Pressure Vapor into a Condensed Mass

The low pressure vapor formed in a distillative freezing operation has to be transformed into a condensed mass. It is desirable to accomplish this without compressing the vapor. In processing a Type 1 mixture and a Type 2 mixture, the vapors formed can be transformed into condensed masses without any compression by a condensation-desublimation operation and a simple condensation operation respectively. In each case, the transformation is accomplished by lowering the temperature by a few degrees.

Let point 3 in FIG. 2 represent the vapor phase obtained in a distillative freezing operation of a Type 1 mixture. When the vapor is cooled to a temperature 8 which is slightly lower than the three phase temperature, it is transformed into a liquid (condensate) 10 and a solid (desublimate) 9. Therefore, this transformation is referred to as a condensation-desublimation operation. It is noted that his operation is possible because the (B-V) region and the (B-L)region are respectively above and below the B-L-V temperature. Referring to FIG. 2, the (mass of desublimate)/(mass of condensate) ratio is given by 8-10/8-9. When a mixture containing close boiling components is processed,points 8 and 10 are very close and the ratio is very small. In othe words, the vapor is mostly transformed into a condensate (liquid), and the amount of desublimate (solid) formed is very small. Referring to FIG. 3, when the vapor (point 3) formed in processing a Type 2 mixture is cooled to a temperature between the temperatures of points 11 and 12, it is transformed completely into a condensate (liquid).

4. Rotary Tray Distillative Freezer

Figure 11:
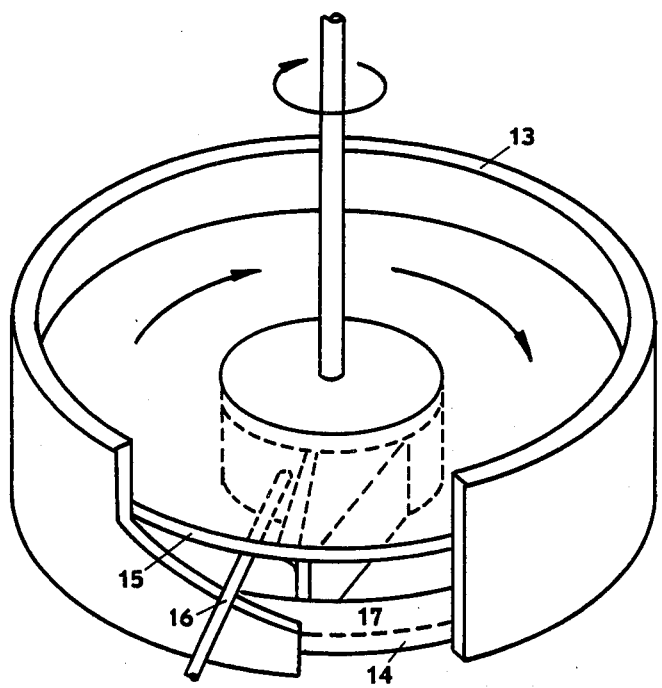
FIG. 11 illustrates a rotary tray distillative freezer. A number of rotary trays may be stacked up in the vertical direction.

FIG. 11 illustrates a rotary tray distillative freezer. It has a stationary containing wall 13, a rotating tray distillative freezer 14 with a peripheral processing region and rotating cover 15. As shown, the tray and cover rotate in the clockwise direction. Feed is added at position 16, and purified B-solid is scraped off at position 17. There is a seal between 16 and 17 to prevent vapor leaking in the counter-clockwise direction. As the disk and cover rotate, the liquid and solid rotate with them and the vapor formed flows from 16 to 17 through the confined space in the clockwise direction, interacting with the liquid phase as vaporization and solidification take place. In an industrial unit, one may stack up many rotary tray distillative freezers.

5. Conveyor Distillative Freezing System

Figures 12, 13, 14:
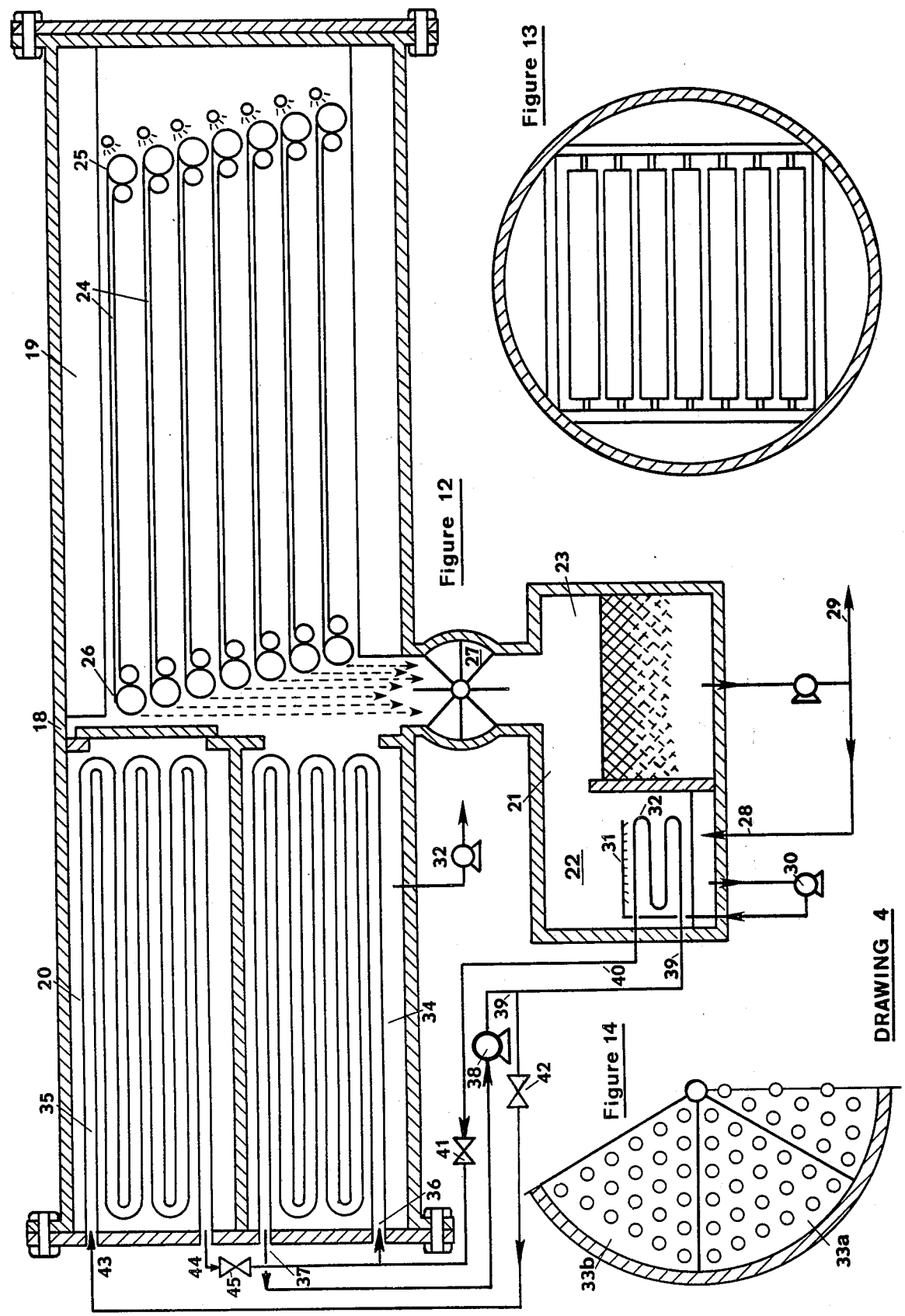
FIG. 12 illustrates a belt conveyor distillative freezer system that comprises a distillative freezing zone, a condensing zone and a melting zone.
FIG. 13 shows a view of the feeding end of the distillative freezing zone and FIG. 14 shows how the condensing zone may be partitioned.

FIG. 12 illustrates a conveyor distillative freezing system. It has a vacuum enclosure 18 and comprises a distillative freezing zone (first zone) 19, a condensing zone (second zone) 20 and a product melting zone (third zone) 21. The third zone comprises a vaporization sub-zone 22 and a melting sub-zone 23.

In the first zone, there are a number of belt conveyors 24 stacked up in the vertical direction. Feed is added on the belt conveyors at the first end 25 and the condensed mass is moved from the first end to the second end 26. FIG. 13 shows the feeding end of the belt conveyors. The vapor formed also moves in the same direction and interacts with the liquid phase. The liquid mass is completely eliminated from the condensed mass before it reaches the second end 26. The purified B-solid is then discharged from the belt conveyors and is collected into the melting sub-zone 23 through a pressure isolating feeder 27.

There are several conventional ways that can be used in melting the purified B-solid. One way is to heat B-liquid above the melting temperature and bring the heated B-liquid in contact with B-solid and thereby melt the B-solid. A novel and efficient method that fits well in the present system is described as follows:

Some purified B-liquid is vaporized in the vaporizatin sub-zone 22 and the B-vapor formed is contacted with the purified B-solid in the melting sub-zone 23. The vapor is condensed and the solid is melted. A part of the B-liquid so formed is recycled 28 to the vaporization sub-zone to be vaporized and the remaining B-liquid becomes the purified B-product 29. The pressure prevailing in the third zone is higher the triple point pressure of pure B-component and is somewhat higher, that the pressure at the discharge end of the conveyors. The pressure isolating feeder serves as a seal to prevent vapor flow from the third zone to the first and second zones. B-liquid may be circulated in the vaporizatin sub-zone by a virculating pump 30 and B-liquid is brought in contact with the vaporization tubes and is vaporized.

In processing a Type 1 mixture, the condensed mass formed by cooling the low pressure vapor may contain some solid which may adhere on the condenser wall. One way to remove the adhering solid is to thaw it off the wall. The condensing zone 20 may be partitioned into several compartments 33a, 33b in the way illustrated by FIG. 14. Condensation and desublimation of the low pressure vapor and thawing of adhering solid are alternately conducted in each compartment. In processing a type 2 mixture, the low pressure vapor can be transformed into a simple condensate and there is no need of partitioning the condensing zone.

The compartment 34 and compartment 35 in FIG. 12 are respectively in a condensing phase and a thawing phase of operation. A working medium liquid is introduced into the condenser tubes 36 in compatment 34. The medium vaporizes to remove the heats of condensation and desublimation of the low pressure vapor. The medium vapor 37 so formed is compressed by a compressor 38 the pressurized medium vapor 39 is condensed in the vaporization tubes 32 in the vaporization sub-zone to become high pressure medium lqiuid 40. The high pressure liquid 40 is throttled through a valve 41 and introduced into the condenser tubes. The operations described are than repeated. A part of the high pressure medium vapor 39 is bypassed through valve 42 and introduced in the tubes 43 in compartment 35 to thaw off the adhering solid and the medium liquid 44 is depressurized through valve 45 and introduced into conduits in compartment 34.

6. Energy Cost and Equipment Cost

In addition to being able to produce superpure product of the crystallizing component, the distillative freezing process has additional advantages in requiring a low energy input and a low cost equipment. There is no energy input in the distillative freezing operation (Step 1), because it is operated under an adiabatic condition. The major energy interactions involved are (1) heat supplied to melt the purified solid (Step 3) and (2) heat removed to condense and desublime the low pressure vapor (Step 2). On the basis of producing one mole of purified product, the heats supplied and removed are both equal to the latent heat of melting and there is no need of any recycling. A heat pump can be used to upgrade the heat removed in the condensation-desublimation step or the condensation step and use the upgraded heat to melt the purified solid. The work (-w) input required in producing a mole or the purified crystallizing component is given by $$(-w)_{D.F.} = \frac{1}{\beta} \cdot \lambda \cdot \frac{T_m - T_c}{T_m}$$

where $\lambda$ is the latent heat of melting one mole of purified solid, $T_m$ is the melting temperature in °K., and $T_c$ is the condensation-desublimation temperature or the simple condensation temperature in °K., and $\beta$ is the efficiency of the heat pump. The work input required is small, because the latent heat of melting is usually only ⅛ to ⅓ of that of the latent heat of vaporization and the $(T_m - T_c)$ value is small.

Figure 15:
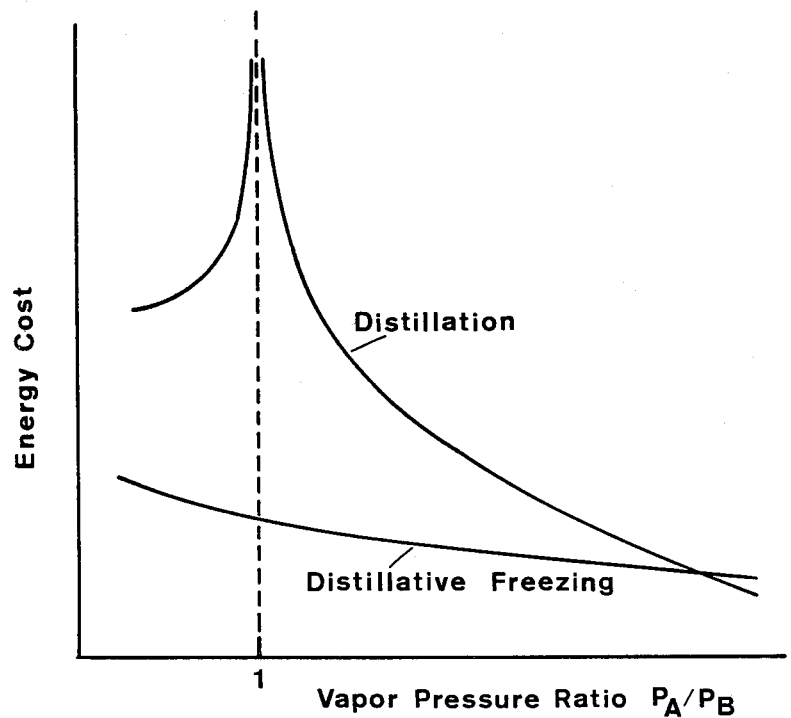
FIG. 15 illustrates energy costs of the conventional distillation process and the distillative freezing process as functions of vapor pressure ratio of the components. It shows that the distillative freezing process is an energy conserving process.

It is instructive to compare the energy consumptions required in separating a given mixture by the distillative freezing process and by the conventional distillation process. The energy inputs required in the distillative freezing process are not strongly affected by the relative volatility of the minor component (A-component) and the major component (B-component). The energy inputs required in the conventional distillation process are strongly related to the relative volatility and depend on whether the volatility of the minor component is greater or less than that of the major component. One may also use a heat pump to upgrade the heat removed in the condenser and utilize it to supply the heat needed in the reboiler. The work input required per mole of purified major component is given by $$(-w)_D = \frac{1}{\beta} \cdot \frac{Q_c}{N} \cdot \frac{T_s - T_c}{T_c}$$

where $Q_c/N$ is the heat removed at the condenser per mole of the purified major component produced, and $T_s$ and $T_c$ are respectively the temperatures at the still and the condenser. The work inputs required in the two processes are plotted against the ratio of the vapor pressures of the minor component and the major component in FIG. 15.

The figure shows that the work input required in the distillative freezing process, $(-w)_{D.F.}$, increases slightly as the $P_A/P_B$ ratio decreases. This increase is caused by the decrease in product/feed ratio illustrated by FIG. 10-a. The figure also shows that the work input required in the conventional distillation process increases drastically as the vapor pressure ratio approaches one. This drastic increase in $(-w)_D$ value is due to the high reflux ratio required and the high $T_s - T_c$ value.

When $P_A/P_B$ is near 1 but less than 1, The work input required in the conventional distillation is generally more than 20 times of that of the distillative freezing process. This is so because of the high reflux ratio and high $T_s - T_c$ value in the distillation and because of the fact that the latent heat of vaporization is generally 3 to 8 times of the latent heat of melting. Separation of a xylene mixture containing p-xylene as the major component and m-xylene as the minor component is a good example.

The equipment cost of the distillative freezing process is low because of the following reasons:

(a) A step of separating mother liquor from the crystals and purifying the crystals has been eliminated.
(b) The low pressure vapor is transformed mostly into a condensate (liquid) and as a pound of vapor condenses, several pounds (3-8 pounds) of purified product is formed.
(c) Distillative freezers illustrated by FIGS. 11 and 12 can be produced at low costs, and the rate of production of purified solid per unit area is very high.
(d) The vacuum is maintained mainly by condensation and desublimation of the low pressure vapor and is not effected by a vacuum pump.

7. Applications of the Distillative Freezing Process

The distillative freezing process is an energy conserving process and can accomplish a superpurification of a crystallizing component. The process may therefore be used to produce superpure monomers for polymer industries, and high purity chemicals for electronic, pigment, pharmaceutical, and other industries. Or, because of the energy conserving nature, one may use the process to replace distillation even when distillation works well. It is noted that the process works particularly well in combinatin with the regular distillation: A regular distillatin is used to first produce a close boiling mixture, from which the major component is superpurified by the distillative freezing.

What we claim are:

1. A crystallization separation process for separating a multi-component mixture that is at least partly in a liquid state and has two key volatile components, denoted respectively as A-component, that volatile non-crystallizing component present in the greatest amount, and B-component, the volatile crystallizing component, into a B-enriched portion and a B-lean portion through formation of a B-enriched solid mass, Wherein the two key components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises a first step of forming a first vapor mixture and a first condensed mass that comprises a mother liquor and a solid phase mass enriched in a B-component by concurrently vaporizing the volatile components from the mixture in a first zone under a first temperature and a first pressure that are respectively lower than the triple point temperature and the triple point pressure of the pure B-component, wherein the improvement comprises providing parallel contact operation by:

(1) conducting the first step in a processing zone that has a first position and second position, introducing feed at the first position and discharging the first condensed mass at the second position;
(2) transferring both the first vapor and the first condensed mass in the direction from the first position toward the second position, allowing the first vapor to interact with the first condensed mass while they are both transferred in the same direction; the pressure gradient from the first position to the second position being maintained by the flow of the first vapor.

2. The process of claim 1, wherein the said first step is continued until the mother liquor phase is reduced to a small amount to thereby transfer substantially all of the A-component in the original mixture to the first vapor mixture and thereby form a purified B-solid.

3. The process of claim 2, which further comprises a second step of transforming the first vapor mixture by itself into a second condensed mass that contains a significant fraction of liquid mass in a second zone by transferring heat therefrom through a heat conducting wall, while maintaining the vapor under a second pressure that is also lower than the triple point pressure of the B-component.

4. The process of claim 3, wherein A-component has a greater volatility than the B-component, whereby the second condensed mass constitutes substantially a liquid output that is relatively enriched with the A-component.

5. A process of claim 4, wherein the said first step is conducted under a substantially adiabatic condition.

6. A process of claim 3, wherein the second condensed mass includes a solid phase that is relatively enriched with respect to B-component.

7. A process of claim 6, wherein the said first step is conducted under a substantially adiabatic condition.

8. A process of claim 3, wherein the first vapor mixture is transformed by itself without a substantial pressurization into the second condensed mass.

9. A process of claim 8, wherein the said first step is conducted under a substantially adiabatic condition.

10. A process of claim 3, wherein the said first step is conducted under a substantially adiabatic condition.

11. A process of claim 2, wherein the said first step is conducted under a substantially adiabatic condition.

12. A process of claim 1, wherein the said first step is conducted under a substantially adiabatic condition.

13. A distillative freezing system for separating a multi-component mixture that is at least partly in a liquid state and has two key volatile components, denoted respectively as A-component, that volatile non-crystallizing component present in the greatest amount, and B-component, the volatile crystallizing component, into a B-enriched portion and a B-lean portion through formation of a B-enriched solid mass, wherein the two key components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises means for providing parallel contact operation including, a distillative freezing zone, a condensing zone, a product melting zone, and a pressure isolating feeder connecting the product melting zone to the distillative freezing zone, wherein the distillative freezing zone has a first position and a second position and includes at least one conveying means conveying from the first position to the second position and a means for introducing feed at the first position, so that, as the feed is concurrently vaporized and solidified to form a first vapor and a first condensed mass that includes a mother liquor and a solid phase mass, both the first vapor and the first condensed mass are transferred in the direction from the first position toward the second position, allowing the first vapor to interact with the first condensed mass continually as they are both transferred in the same direction; the first condensed mass being discharged from the distillative freezing zone at the second position and introduced to the product melting zone though the pressure isolating feeder, and the pressure gradient from the first position to the second position being maintained by the flow of the first vapor.

14. The system of claim 13, wherein the conveying means is a rotating tray.

15. A system of claim 14, wherein the distillative freezing zone is a substantially adiabatic zone.

16. The system of claim 13, wherein the conveying means is a belt conveyor.

17. A system of claim 16, wherein the distillative freezing zone is a substantially adiabatic zone.

18. The system of claim 13, wherein the product melting zone comprises a vaporization sub-zone and means to heat and vaporize B-enriched liquid and a melting sub-zone that is in vapor communication with the vaporization sub-zone so that the B-enriched vapor that is formed in the vaporization sub-zone can be brought in contact with the B-enriched solid in the melting sub-zone to thereby condense the vapor and melt the solid.

19. A system of claim 18, wherein the distillative freezing zone is a substantially adiabatic zone.

20. A system of claim 13, wherein the distillative freezing zone is a substantially adiabatic zone.

* * * * *